US012510392B2

United States Patent
Godager et al.

(10) Patent No.: US 12,510,392 B2
(45) Date of Patent: Dec. 30, 2025

(54) IN-LINE FLOWMETER SENSOR DEVICE, IN-LINE FLOWMETER AND METHOD FOR REAL-TIME MONITORING OF A VOLUMETRIC RATIO OF FLUID

(71) Applicant: Halliburton Energy Services, Inc., Houston, TX (US)

(72) Inventors: Øivind Godager, Sandefjord (NO); Jan Vidar Godager, Tønsberg (NO)

(73) Assignee: Halliburton Energy Services, Inc., Houston, TX (US)

(*) Notice: Subject to any disclaimer, the term of this patent is extended or adjusted under 35 U.S.C. 154(b) by 141 days.

(21) Appl. No.: 18/693,860

(22) PCT Filed: Sep. 20, 2022

(86) PCT No.: PCT/NO2022/050217
§ 371 (c)(1),
(2) Date: Mar. 20, 2024

(87) PCT Pub. No.: WO2023/048578
PCT Pub. Date: Mar. 30, 2023

(65) Prior Publication Data
US 2024/0401994 A1 Dec. 5, 2024

(30) Foreign Application Priority Data
Sep. 21, 2021 (NO) .................................... 20211133

(51) Int. Cl.
*G01F 1/74* (2006.01)
*G01F 1/66* (2022.01)

(52) U.S. Cl.
CPC ................ *G01F 1/74* (2013.01); *G01F 1/662* (2013.01)

(58) Field of Classification Search
CPC . G01F 1/74; G01F 1/662; G01F 1/582; G01F 1/66; G01F 1/58; E21B 43/00; E21B 47/00; G01N 27/22
See application file for complete search history.

(56) References Cited

U.S. PATENT DOCUMENTS

| 4,574,643 A | 3/1986 | Scott et al. |
| 5,389,883 A | 2/1995 | Harper |

(Continued)

FOREIGN PATENT DOCUMENTS

| CN | 102147384 A | 8/2011 |
| CN | 103697950 B | 1/2017 |

(Continued)

OTHER PUBLICATIONS

International Search Report for PCT/NO2022/050217 mailed on Jan. 9, 2023.

(Continued)

*Primary Examiner* — Lee E Rodak
*Assistant Examiner* — Zannatul Ferdous
(74) *Attorney, Agent, or Firm* — Scott Richardson; C. Tumey Law Group, PLLC (57) ABSTRACT

An in-line flowmeter sensor device and an in-line flowmeter are configured to be arranged in-line with a conduit supporting a multi-phase fluid flow including first and second matter groups. The second matter group has a lower density than the first matter group. The sensor device includes: an inlet and an outlet arranged at respective ends of the flowmeter sensor device; and a measurement chamber arranged between the inlet and the outlet. The measurement chamber is configured to split the first and second matter groups into first and second flow regions, respectively, of the measurement chamber. A flow meter sensor element is arranged in or adjacent the first region.

10 Claims, 6 Drawing Sheets

(56) References Cited

U.S. PATENT DOCUMENTS

| | | | |
|---|---|---|---|
| 6,306,296 B1 * | 10/2001 | Kerfoot | B09C 1/002 |
| | | | 210/170.07 |
| 2002/0184940 A1 * | 12/2002 | Storm, Jr. | E21B 47/06 |
| | | | 73/579 |
| 2006/0158192 A1 | 7/2006 | Beaulieu et al. | |
| 2008/0319685 A1 | 12/2008 | Xie et al. | |
| 2011/0125333 A1 * | 5/2011 | Gray | E21B 21/08 |
| | | | 175/48 |
| 2013/0047709 A1 | 2/2013 | Xie et al. | |

FOREIGN PATENT DOCUMENTS

| | | |
|---|---|---|
| CN | 112452565 A | 3/2021 |
| NO | 345738 B1 | 7/2021 |
| WO | WO 2020/204724 A1 | 10/2020 |

OTHER PUBLICATIONS

Written Opinion of the International Searching Authority for PCT/NO2022/050217 mailed on Jan. 9, 2023.

* cited by examiner

IN-LINE FLOWMETER SENSOR DEVICE, IN-LINE FLOWMETER AND METHOD FOR REAL-TIME MONITORING OF A VOLUMETRIC RATIO OF FLUID

TECHNICAL FIELD

The present invention relates to instrumentation and measurement techniques to measure flow properties, such as volumetric fractions of matter in a multiphase flow, e.g., water in oil in a multiphase flow comprising oil, water, and gas.

BACKGROUND

The subject of multiphase flow measurement encompasses a number of technologies and applications, and the ability to predict or determine the properties of the fluid flow is important for the result of the processes where the multiphase flow is involved.

One such process may be oil and gas production, where the output from an oil and gas reservoir in many cases consists of a mixture of oil, water and gas. In order to successfully manage reservoirs and to optimize production and allocation of equipment, it is important to monitor oil, gas and water rates from individual wells.

Conventionally, test separators are used for this purpose. However, such separators require interruption of the production for a significant amount of time and cannot be used in real time. Due to fluctuations in the wells behavior, the results obtained during the measurement may not be correct in the periods between the measurements.

In addition, since test separators are costly, a common test separator is often connected to multiple wells by pipes and valves that in itself increases complexity and costs of the plant.

Therefore, production could be optimized if fluid flow could be monitored in-line in real time separately for each well.

The same considerations apply for other industries involving multiphase flow, such as e.g., for vegetable oils and fats, or wastewater treatment or recycling. Real time monitoring of the flow components and flow composition could improve production and reduce waste.

Norwegian U.S. Pat. No. 345,738 B1 discloses an electromagnetic flowmeter and a method for measuring a property of a fluid composition, comprising a first electric conductor with first and second ends, configured to be arranged inside a fluid conduit carrying a fluid composition comprising hydrocarbons connected to an RF electric signal source.

US2008/0319685A1 discloses systems for measuring multiphase flows in a pipeline using a combination of venturi, microwave and radiation techniques, where the pipeline is configured to transport hydrocarbons.

CN112452565A discloses a cyclone for multiphase flow measurement, wherein the cyclone separates gas and liquid phases in three-phase flow and has a standard flow pattern.

CN103697950B is using a switchable venturi tube component, a single-energy gamma sensor, an online gas-liquid separation device and a double-energy gamma sensor for measuring flow of oil, gas and water.

SHORT SUMMARY

A goal with the present invention is to overcome the problems of prior art, and to disclose a flow meter sensor device and a flow meter that more accurately may be used to monitor properties of a multi-phase fluid flow, such as e.g., water in oil in real time.

The invention solving the above mentioned problems is an in-line flowmeter device, an in-line flowmeter and a method for real-time monitoring of a volumetric ratio of fluid according to the independent claims.

The flowmeter sensor device and the flowmeter according to the invention are simple to manufacture and use in real life situations, such as in process plants.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In a first embodiment EM1 the invention is an in-line flowmeter sensor device 1 configured to be arranged in-line with a conduit 2 supporting a multi-phase fluid flow comprising first and second matter groups, wherein the second matter group has a lower density than the first matter group, and wherein the sensor device comprises;
- an inlet and an outlet 10, 20 arranged at respective ends of the flowmeter sensor device 1,
- a measurement chamber 30 arranged between the inlet and the outlet, wherein the measurement chamber is configured to split the first and second matter groups into first and second flow regions 31, 32, respectively, of the measurement chamber 30, and
- a flow meter sensor element 50 arranged in or adjacent the first region 31, wherein the flow measurement chamber 30 comprises;
- a diverging section 11 arranged at the inlet end 10, and
- a first tubular element 22 connected to the diverging section 11 in a first end, wherein the inner diameter of the first tubular element 22 is larger than the inner diameter of the conduit 2, wherein the diverging section 11 is tapered towards the inlet 10.

Due to the split of matter, the accuracy of the sensor device measuring properties of the second matter group may be improved, since the second matter group, is temporarily removed from the first flow region 31 where the sensor element 50 is located.

In a first dependent embodiment, the measurement chamber 30 is configured to decrease the speed of the first matter group in the first region 31, relative to the speed of the second matter group in the second region 32.

In a second dependent embodiment that may be combined with the first dependent embodiment, any of the first or second regions 31, 32 are annular or cylindrical.

In a third dependent embodiment that may be combined with the first or second dependent embodiment, the first region 31 is an annular region outside the second region 32.

In a fourth dependent embodiment, the flow measurement chamber 30 comprises;
- a converging section 21 arranged at the outlet end 20, wherein
- the first tubular element 22 is connected to the diverging section 11 in a second end.

In a fourth dependent embodiment that may be combined with the third dependent embodiment, the converging section 21 is tapered towards the outlet 20.

In a fifth dependent embodiment, that may be combined with any of the first to fourth dependent embodiments, an inner wall of the measurement chamber comprises helical grooves and/or helical protrusions.

Any of the diverging section 11, the first tubular element 22 and the converging section 21 above may be provided with helical grooves or protrusions that will further reduce the speed of the first matter group by creating centrifugal force causing the denser first matter group to move radially outward and displacing the less dense second matter group towards the centre.

In a sixth dependent embodiment, that may be combined with any of the first to fifth dependent embodiments, in-line flowmeter sensor device 1 comprises a motor configured to rotate the measurement chamber relative to the inlet 10 and outlet 20, in order to provide a centrifugal force acting on the multi-phase fluid flow.

In a third embodiment EM3, that may be combined with EM1 or EM2, the in-line flowmeter sensor device 1 comprises a second tubular element 40 between the inlet 10 and the outlet 20 with an outer diameter OD smaller than the inner diameter ID of the first tubular element 40, wherein the first region 31 is between the first and the second tubular elements 30,40.

In a first dependent embodiment, the second tubular element 40 comprises holes or perforations allowing first and second fluid phases to pass through.

In a second dependent embodiment, that may be combined with the first dependent embodiment, the holes or perforations are multiple longitudinal slits arranged along and around the second tubular element 40.

In a third dependent embodiment, that may be combined with the first or second dependent embodiments, the inner diameter of the second tubular element 40 is smaller than the inner diameter of the inlet 10, and the inlet 10 is connected to the second tubular element 40 via a constricting section 41.

In a fourth dependent embodiment, that may be combined with any of the third to fourth dependent embodiments, the inner diameter of the second tubular element 40 is smaller than the inner diameter of the outlet 20, and the second tubular element 40 is connected to the outlet 20 via an expanding section 42.

In a fifth dependent embodiment, that may be combined with any of the first to fourth dependent embodiments, the measurement chamber 30 comprises a tesla valve configured to reduce the speed of the first matter group.

In a fourth embodiment EM4, that may be combined with any of EM1 to EM3, the flow meter sensor element 50 is fixed to the inside wall of the measurement chamber 30 or the outside wall of the second tubular element.

In a first dependent embodiment, the flow meter sensor element 50 comprises a first electric conductor with first and second ends extending through the wall of the measurement chamber 30.

In a second dependent embodiment, that may be combined with the first dependent embodiment, the electric conductor is arranged coiled in the in the first region 31, around the first region 32.

In a third dependent embodiment, that may be combined with the second dependent embodiment, the electric conductor comprises an insulator configured to insulate the electric conductor electrically from the fluid flow.

In a fourth dependent embodiment, that may be combined with the second or third dependent embodiment, the flow meter sensor element 50 comprises a cylindrical holder 34, wherein the electric conductor is arranged coiled in the wall of the holder 34 and the holder is arranged in or adjacent the first region 31.

In an embodiment EM5, that may be combined with any of EM1 to EM 5 above, the first matter group may comprise liquid, such as water and oil and the second matter group may comprise gas.

Due to the design of the flow measurement chamber 30, the gas will increase its speed and travel through the second region 32, while the liquid will slow down in the first region 31. Since liquid is now temporarily isolated from gas, the volumetric fraction of the liquids relative to each other can be found by further analysing the output of the flow meter sensor element 50.

In an independent embodiment ES1, the invention is an in-line flowmeter 100 configured to be arranged in-line with a conduit 2 supporting a multi-phase fluid flow, wherein the flow meter comprises;
- an in-line flowmeter sensor device 1 according to any of EM1 to EM4,
- a Radio Frequency (RF) electric signal source 51, and
- a dual Radio Frequency (RF) signal detector 8 comprising first and second input ports,
- a signal processor connected to the signal detector 8, wherein a first terminal of the electric signal source 1 is connected to the first end of the first electric conductor 13 and configured to induce a Radio Frequency electromagnetic wave in the fluid conduit 14, 28 by supplying an input electric signal to the first end of the first electric conductor 13,
the first and second ports of the signal detector 8 are connected to the first and second ends of the first electric conductor 13, respectively.

In a first dependent embodiment, the measurement chamber 30 is configured to act as a waveguide for the Radio Frequency RF signal along the electric conductor 13.

In a second dependent embodiment, that may be combined with the first dependent embodiment, the measurement chamber 30, the Radio Frequency (RF) electric signal source 1 and the dual Radio Frequency (RF) signal detector 8 have a common electric reference.

In a third dependent embodiment, that may be combined with the first or second dependent embodiment, the signal processor is configured to determine a dielectric constant and a conductivity of the first matter group.

In a fourth dependent embodiment, that may be combined with the second or third dependent embodiment, the signal processor is configured to determine the volumetric ratio of fluid phases in the first matter group based on the dielectric constant and a conductivity of the first matter group.

In a fifth dependent embodiment, that may be combined with any of the first to fourth dependent embodiment, the signal processor is configured to detect voltages and a phase difference of signals input on the first and second ports of the first electric conductor.

In a sixth dependent embodiment, that may be combined with any of the first to fifth dependent embodiment, the signal processor is configured to compare amplitude and phase of any of the input electric signal, the output electric signal and the reflected input electric signal.

In a seventh dependent embodiment, that may be combined with any of the first to sixth dependent embodiment, the first dual signal detector comprises a bidirectional bridge with dual RMS and Peak-to-Peak detectors and a phase detector.

In an embodiment, the invention is also a method for real-time monitoring of a volumetric ratio of fluid phases in a first matter group of a multiphase fluid flow comprising first and second matter groups, wherein the second matter group has a lower density than the first matter group. The method comprises;
- arranging an in-line flowmeter sensor device 1 of any of EM1 to EM5 in line with a conduit 2 supporting a multiphase fluid flow.
- connecting the flow meter sensor element 50 to a flow meter configured to determine a volumetric ratio of fluid phases in the first matter group based on the characteristics of the sensor element 50.

For this embodiment, any sensor element configured to sense variations in the fluid composition may be used and connected to a matching flowmeter. As long as the sensor element is arranged in the first region of the flowmeter sensor device 1, measurements and real-time monitoring can be improved compared to arrangement of the sensor element according to prior art.

In a dependent embodiment the flowmeter is the in-line flowmeter of ES1.

A detailed description of a specific embodiment of the in-line flowmeter 100 comprising an in-line flow-meter device 1 is given in the following. The in-line flowmeter 100 is here a water cut flow meter configured to measure the ratio of water in oil in a multiphase fluid.

Figure 4:
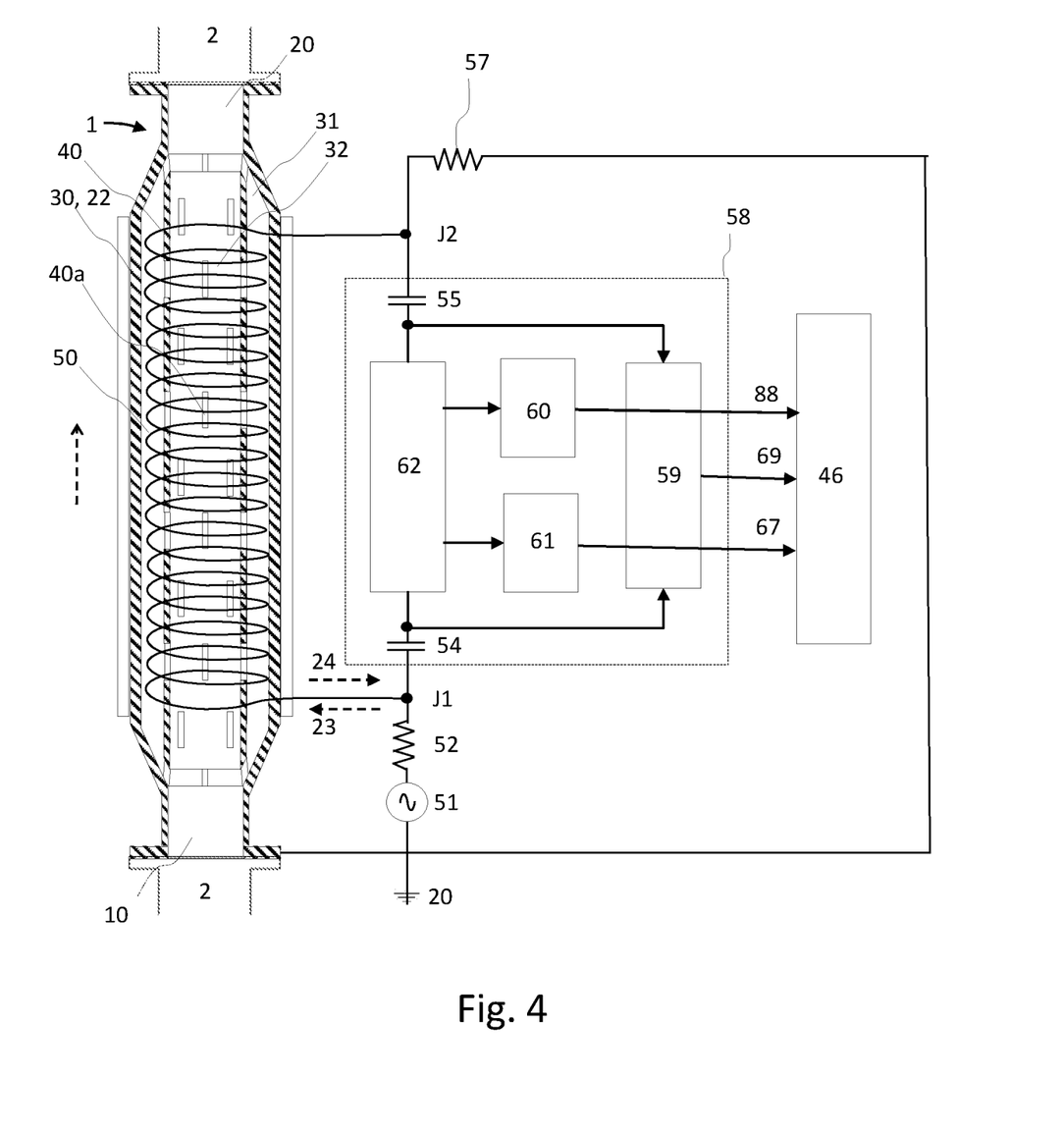
FIG. 4 is combined cross-sectional and schematic diagram illustrating an in-line flowmeter comprising an in-line flowmeter sensor device 1. In this embodiment the flowmeter is a water-cut flowmeter (WCM). The in-line flowmeter sensor device 1 comprises an electric conductor arranged in a spiral in the annular second flow region 32, and the relationship between incident RF signal 23 and the reflected RF signal 24 are analysed in a dual Radio Frequency (RF) signal detector 8.
Figure 5:
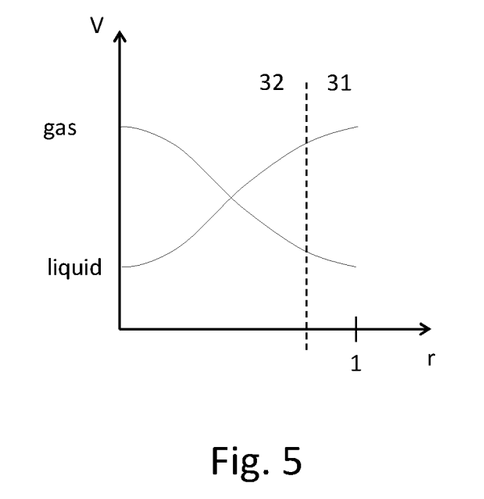
FIG. 5 illustrates in a graph an example of the volumetric distribution of gas and liquid as a function of the radius from the centre of the measurement chamber 30. The stapled vertical line illustrates the border between the first and second regions 31, 32.
Figure 6:
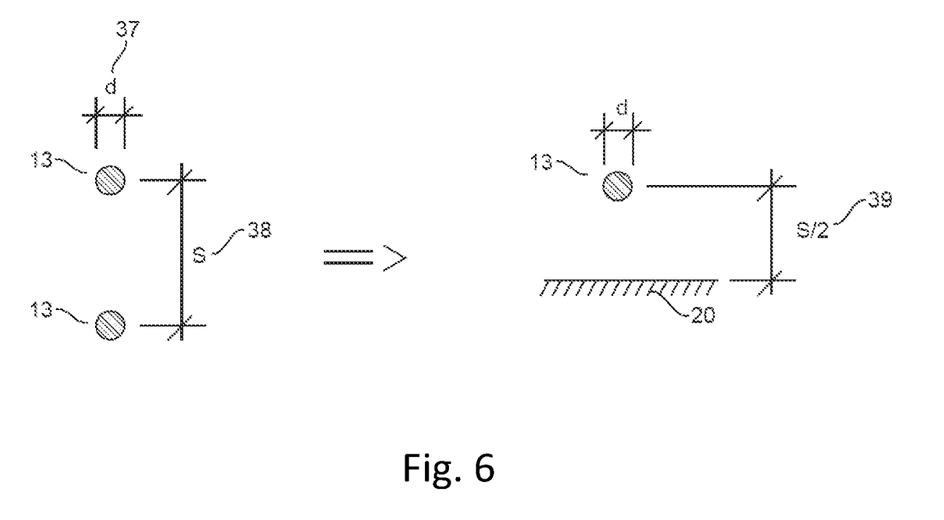
FIG. 6 illustrates equivalence between a transmission line with parallel wires and a single spiral line (left) and a ground plane (right).

The water-cut flow meter measures the fluid properties of a flow process, where the in-line flowmeter sensor device 1 of the flow meter 100 is a arranged in-line with a conduit 2 or pipe, as seen in FIG. 4. Flow direction in in the conduit is from bottom to top as indicated by the stapled arrow. The multi-phase fluid flow passing through the conduit 2 may comprise first and second matter groups, wherein the second matter group has a lower density than the first matter group, e.g., the first matter group comprises oil and water and the second matter group comprises gas.

The sensor device 1 comprises an inlet and an outlet 10, 20 allowing the sensor device to be connected in-line with the conduit 2.

Further, the sensor device 1 comprises a measurement chamber 30 arranged between the inlet and the outlet, comprising a diverging section 11 tapered towards the inlet and a converging section 21 tapered towards the outlet. The diverging and converging sections are interconnected by a first tubular element or section 22 of the measurement chamber with an inner diameter larger than the inner diameter of the conduit 2.

Figure 1:
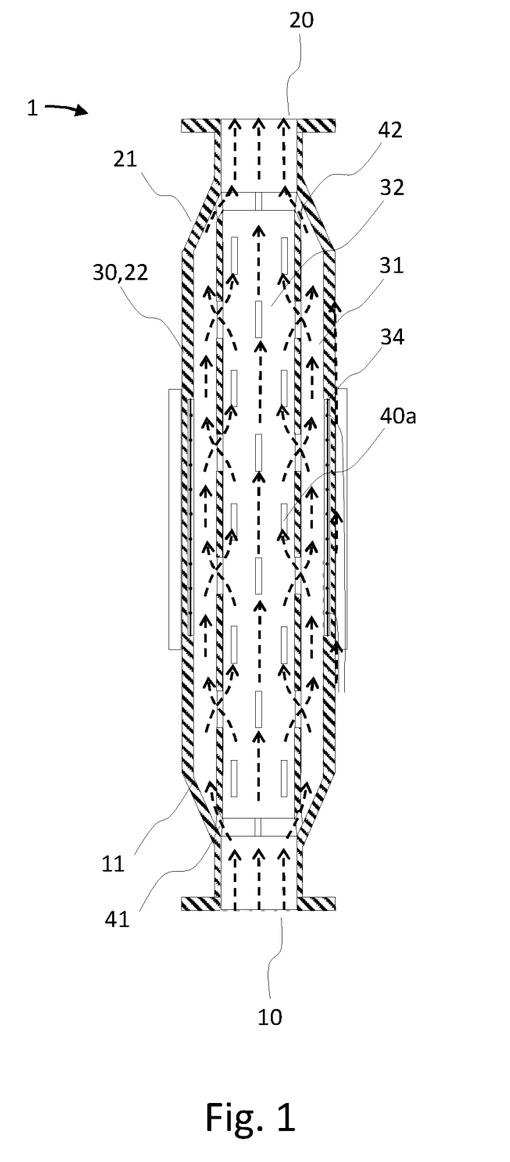
FIG. 1 illustrates an in-line flowmeter sensor device 1 according to an embodiment of the invention. The arrows may represent flow movements of the multi-phase flow entering through the inlet 10 and exiting outlet 20. Longer arrows are meant to illustrate faster moving matter, such as gas, while shorter arrows may represent liquids.
Figure 2:
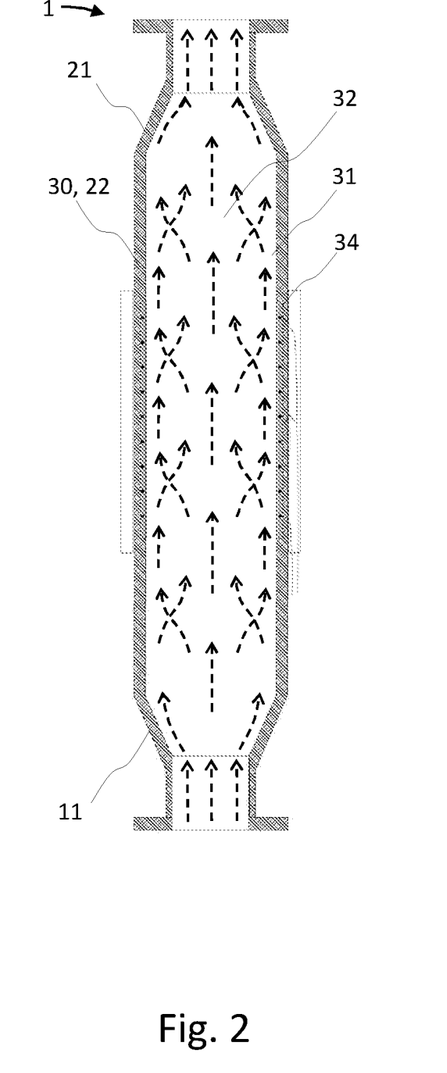
FIG. 2 illustrates an in-line flowmeter sensor device 1 according to an embodiment of the invention. The arrows may represent flow movements of the multi-phase flow entering through the inlet 10 and exiting outlet 20. Longer arrows are meant to illustrate faster moving matter, such as gas, while shorter arrows may represent

Due to the widened area of the measurement chamber, each of the matter groups of the flow will behave differently when flowing through as illustrated in FIGS. 1 and 2. While matter groups with relatively higher density will accelerate from the inlet 10 in the middle of the measurement chamber as indicated by the longer dashed arrows, matter groups with relatively lower density will slow down and flow upwards in the outer parts of the measurement chamber, as indicated by shorter dashed lines. In the outer annular region the ratio of the first matter group with regard to the total matter will be higher than the ratio of the first matter group with regards to the total matter in the conduit 2.

The first and second matter groups are therefore split into first and second flow regions 31, 32, respectively, where the first flow region 31 is annularly arranged about the second flow region 32.

A flow sensor element 50 is arranged in the first flow region. Due to the split of matter, and since the main objective in this embodiment is to measure the ratio of water in oil, the accuracy of the measurement can be improved, since the second matter group, i.e., gas in this case, is temporarily removed from the area where the sensor element 50 is located.

In this embodiment, the in-line flowmeter sensor device 1 comprises a second tubular element 40 between the inlet 10 and the outlet 20 with an outer diameter OD smaller than the inner diameter ID of the first tubular element 40, wherein the first region 31 is between the first and the second tubular elements 30, 40. The second tubular element 40 comprises multiple through-slits 40a arranged along and around the second tubular element 40, allowing first and second fluid phases to pass through.

The inner tubular 40 further improves the separation of the first and second matter types, and measurement accuracy can be further improved. FIG. 1 illustrates by arrows how the first and second matter can pass through the slits. Since the more dense matter slows down, it will flow into the annular first region 31. The less dense matter will accelerate and try to escape into the central region with higher flow velocity. The inner tubular 40 has the effect that the flow becomes less turbulent, and that the composition of the matter is more stable in the first region where the sensor element 50 is located.

To further improve flow characteristics, the inner diameter of the second tubular element 40 is in this embodiment smaller than the inner diameter of the inlet 10 and the outlet 20, and the inlet 10 and outlet 20 are connected to the second tubular element 40 via a constricting and an expanding section 41, 42, respectively.

In a fourth dependent embodiment, that may be combined with any of the third to fourth dependent embodiments, the inner diameter of the second tubular element 40 is smaller than the inner diameter of the outlet 20, and the second tubular element 40 is connected to the outlet 20 via an expanding section 42. This has been illustrated in FIG. 1, where it can be seen that the incoming flow from the inlet 10 faces a small restriction that immediately forces matter to enter through the slits into the first region 31.

While different types of in-line flowmeters may benefit from the in-line flowmeter sensor device 1 presented so far, the current embodiment is based on RF technology.

The sensor element 50 is a an electric conductor 13 spiraled in the first region 31 where a Radio Frequency (RF) electric signal source 51, is connected to one end of the electric conductor and the incident and returned RF signals 23, 24 are analyzed in a signal detector 58, such as a vector network analyzer to obtain the s-parameters of the electric conductor, which in this case can be seen as the device under test DUT. The value of the s-parameters varies with the composition of the flow in the first region 31 and are further processed in a processor 46 to calculate the desired flow properties, e.g., the water-cut.

The signal detector and processing will now be explained in more detail. The sensor device 1 is provided with a transmission line that is exposed to the process media flowing through it. An electrical signal is induced to one end of the transmission line and is guided along through a sample section (cell), having a stream of petroleum fluid passing through it. The electric conductor arranged in the measurement chamber 30 acting as a waveguide can be seen as the transmission line.

As the EM wave propagates along the transmission line the wave speed and energy level guided will be affected by the dielectric constant and the conductivity of the fluid exposed. Consequently, there will be a change in energy level and phase of the wave as it propagates. In absolute terms, the amount of change will be depending upon the physical properties of the transmission line and how much water and oil there is in the sample section. However, as the properties of the transmission line will be known and the same (fixed/constant) the relative changes measured at the reception will be directly with respect to the fluid properties.

Further, a cell having a simple transmission line constructed in part by a metal wire has a very wide bandwidth. It is much wider than the bandwidths seen by prior art that utilize transmitting and receiving antennas, phase-lag or attenuation devices, or resonance measuring devices. The dielectric property of produced water is typically=80, oil=3, and natural gas=1, so any small change in water content will produce a rather large contrast in their electrical properties. According to theory, sampling at lower frequency will respond to resistivity or conductivity. Vise-versa, at higher frequency sampling will respond to the dielectric property changes of the media.

Measurement of the EM-wave propagation along a transmission line may be done from a medium range into a very high frequency domain. This in turn, eases the physical construction of an application specific apparatus. It provides dimensional and functional freedom to make an advanced flow instrument that would fit any size upstream petroleum requirement.

Furthermore, when the transmission line is spiraled numerous of turns inside a tubular section, the propagation of the EM-wave will more represent a capture of the true fluid composition within the cell, thus, eliminating the need of a mechanical mixer. Moreover, the flowmeter, or water-cut meter may be installed in either vertical or horizontal position.

Figure 3:
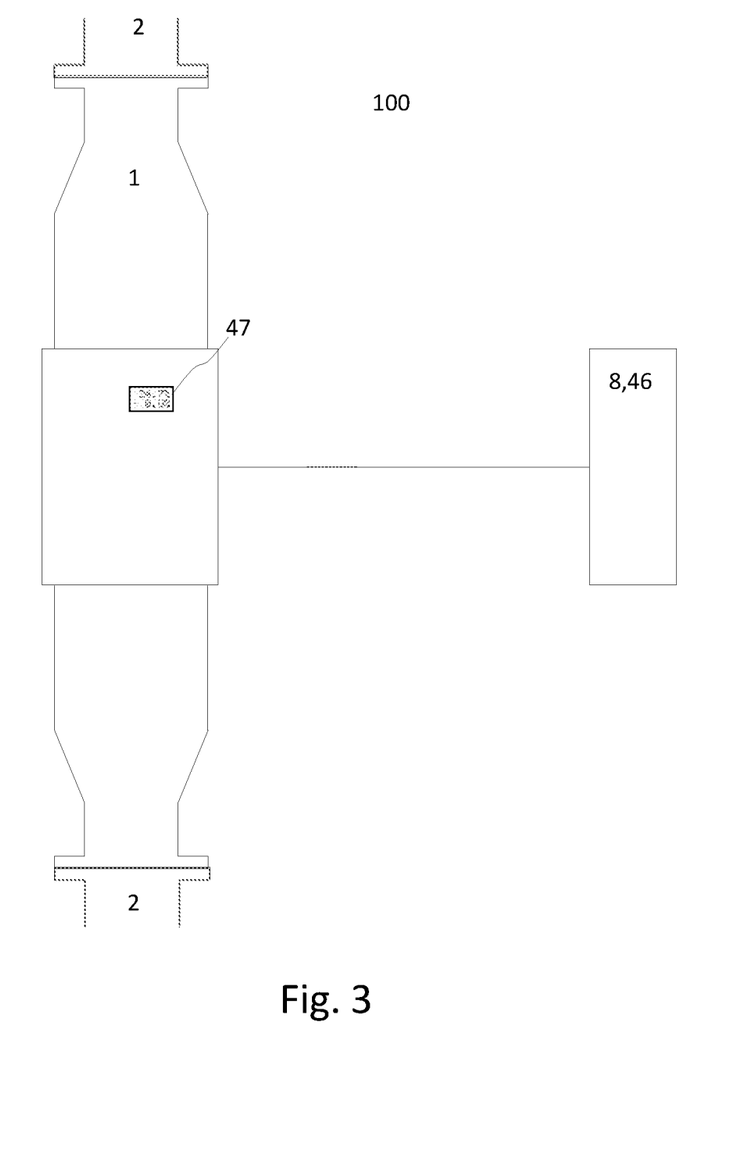
FIG. 3 illustrates an in-line flowmeter 100 according to an embodiment of the invention, comprising in addition to the in-line flowmeter sensor device 1, a processing unit 46 and a display 47. While the processing unit is shown remote from the in-line flowmeter sensor device 1 in this embodiment, the processing unit may in a separate embodiment be integrated with the in-line flowmeter sensor device 1 to create a stand-alone in-line flowmeter with direct reading of the flow properties.

A signal detector 58 monitors the propagation of the EM-wave and a signal processor 46 digests the measures taken and outputs engineering values representing the oil-in-water or the water-in-oil contents respectively. The processor 46 outputs are then transmitted to an indicator station monitoring and recording the water-cut of the petroleum stream in accordance with the received signals from the signal detector. The real-time water cut may also be displayed locally for each well as exemplified in FIG. 3.

The water-cut meter shown in FIG. 4 includes an electric signal source, such as a Radio Frequency (RF) source or transmitter, 51 providing electromagnetic energy, hereafter called RF-source. The RF-source 51 is low power and operates from medium to very high frequency band (1 MHz-300 MHz) and may use a digital signal processing to synthesize a waveform followed by a digital to analog converter (DAC) to produce an analog sine wave output. The RF-source 51 provides RF-power to the transmission line via serial impedance 52. The transmission line is a wave guide comprising an electric conductor 13, such as a wire, wherein the outer wall of the measurement chamber 30. connected to ground 20, that is also the ground of the signal source 51.

The conductance of the RF-energy is carried out by the transmission line as a wave-guide and is terminated at the opposite end by impedance match circuit 57. The RF-signal injected to the electric conductor 13 is guided along the waveguide, i.e. interior of the by the conductor and conductive ground 20, and as it propagates it is exposed to the flow passing from 10 to outlet 20. Thus, as the RF-signal injected is guided along the transmission line, the energy is absorbed by the stream or flow. By measuring the amplitude of the wave as it is injected at J1 and comparing it with the amplitude at the reception J2 the energy absorbed by the stream may be accomplished.

Signal detector 58 is a bidirectional bridge with dual RMS and Peak-to-Peak detectors, 60 and 61, for RF power and return-loss measurement in accomplishment with a phase detector 59. The latter measures the phase-lag between the incident 23 and the returned 24 signal at reference points J1 and J2, respectively.

The signal detector 58 is coupled with capacitors 54 and 55 respectively to provide cut-off of any DC components to the incident 23 and return 24 input signal lines.

A directional coupler configuration 62 is used to sense RF power at J1 and J2 in the signal chain monitoring performance of the RF-signal as it propagates along the transmission line.

Furthermore, a second parameter is measured by signal detector 58, where a phase detector 59 compares the phase of the incident 23 and return 24 path signals. The difference between the phases, namely the phase lag will give additional information of the RF-signal propagation over the transmission line 21. Both the RMS/Peak-to-Peak outputs 67 and 68 as well as the phase output 69 are required to estimate the water-cut of the petroleum stream flowing. The relationship between the parameters 67, 68, and 69 measured by the signal detector 58 and the water-cut stream will be described later. The output from the signal detector may be s-parameters. S-parameters is a standard way of characterizing a high-frequency circuit, by determining the reflection and transmission characteristics in the frequency domain.

For those skilled in the art, the measurement set-up described above is often referred to as vector network analyzer type. The term "vector network analyzer measurement' means that:

both the magnitude and the phase is measured the s parameters are measured

Normally, the voltage or current at any point of the measurement section will have two terms. One forward wave and one reflected wave respectively, as described in equation 5, below. To measure the propagation constant k in equation 5, one needs to separate those two waves. E.g., measuring the forward wave means measuring s12 in s-Parameter.

An oil-in-water or water-in-oil process flow rarely appear homogenous. The proposed configuration of the transmission line will provide a very representative sample-volume that enhance the monitor of the true fluid mixture flowing through the pipeline at any time. This feature eliminates the need for a homogenous fluid sample and cancels the need to make use of mechanical mixers upstream, as well as need of a specific physical orientation of the flow meter when it is mounted and servicing to monitor the fluid mixture in a petroleum pipeline.

Figure 7A:
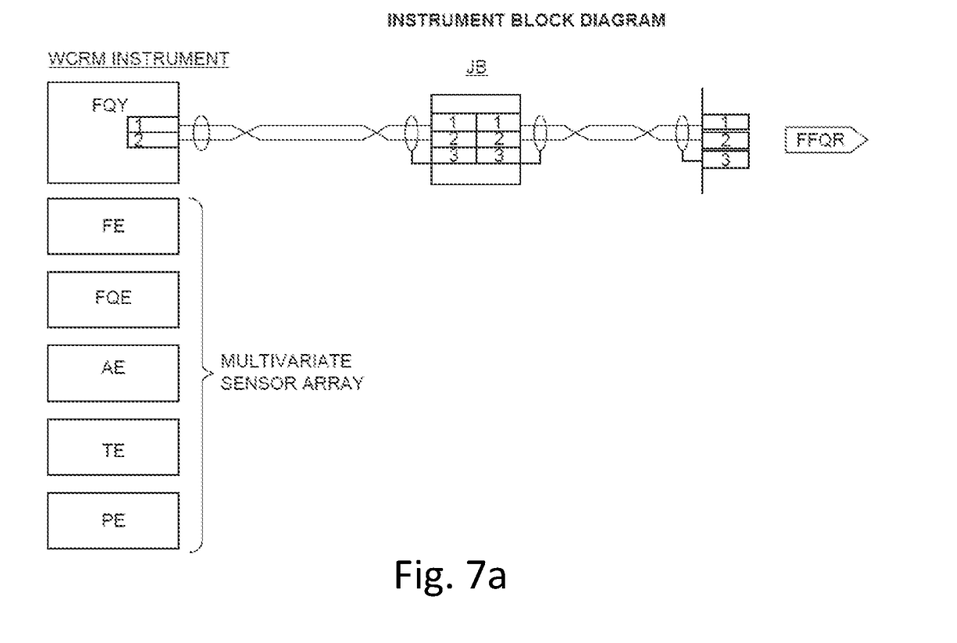
FIG. 7a shows an embodiment of the instrument block diagram of the flowmeter used to measure a water cut.
Figure 7B:
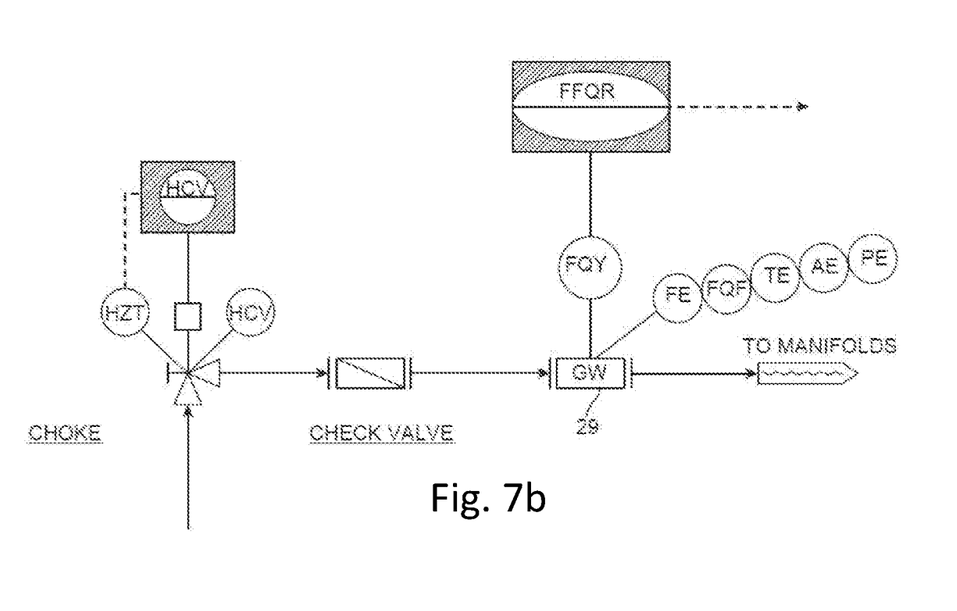
FIG. 7b illustrates in an example a typical instrument loop diagram including the Flowmeter connected to a typical process control system.

Now referring to FIG. 7 to give a more detailed description of the propagation of the incident 23 and reflected 24 RF-signal on the transmission line 13.

We want to establish expressions for the Capacitance C, Inductance L, and Conductance G, for the spiral electric conductor 13. By introducing a ground metal plane 20, a parallel wires transmission line equivalent to a single wire 13 above the metal plane 20 can be derived, see the equivalence in FIG. 7 to the right. The wire 13 and ground plane structure 20 can be used to analyze a spiral line of diameter d, 37, as long as the distance between the spiral turns 38 are much larger than the distance 39 between the wire 13 and ground plane 20.

The capacitance and inductance of the parallel wires and the wave propagation along the wire 13:

$$\text{Capacitance } C, \left[\frac{\text{Farads}}{\text{meter}}\right] \quad C, = \frac{\pi \varepsilon_1}{\cosh^{-1}\left(\frac{s}{d}\right)} \quad [1]$$

$$\text{External inductance } L, \left[\frac{\text{henry}}{\text{meter}}\right] \quad L, = \frac{\mu_1}{\pi}\cosh^{-1}\left(\frac{s}{d}\right) \quad [2]$$

-continued $$\text{Conductance } G, \left[\frac{\text{mhos}}{\text{meter}}\right] \quad G, = \frac{\pi\sigma_1}{\cosh^{-1}\left(\frac{s}{d}\right)} = \frac{\pi\omega\varepsilon_0\varepsilon''}{\cosh^{-1}\left(\frac{s}{d}\right)} \quad [3]$$

In expressions [1] and [2] above C and L are respectively capacitance and inductance per unit length of the parallel wires 13.

Where $\varepsilon_1$ is equivalent dielectric coefficient, and $$\varepsilon_1 = \varepsilon_r \varepsilon_0 - \frac{j\sigma}{\omega}, \quad [4]$$

where $\varepsilon_r$ is relative dielectric coefficient $e_0$ is the dielectric constant of air $\sigma$ is the conductivity, and $\mu_1 = \mu_0$ is the magnetic permeability Thus, the wave propagating along the transmission line can be written as S-parameters based on the wave equations:

$$W(x) = ae^{-jkx} + be^{jkx}, \quad [5]$$

where the first term $ae^{-jkx}$ is the forward or incident wave 23 and $be^{jkx}$ is the reflected wave 24.

S11 is defined as the ratio of the reflected wave to the incident wave. Thus:

$$S11 = \frac{be^{jkx}}{ae^{-jkx}} = \frac{b}{a}e^{2jkx} \quad [5a]$$

In equation [5] and [5a], k is the propagation coefficient, and:

$$k = 2\pi f \sqrt{LC} = 2\pi f \sqrt{\varepsilon_1 \mu_0} = \omega \sqrt{\varepsilon_1 \mu_0} \quad [6]$$

Conclusively, the main task of the flow meter is to establish the propagation coefficient k in equation [6] which is expressed in complex means by dielectric coefficient $\varepsilon_1$, and $\varepsilon_1$ is further related to relative dielectric constant and conductivity of the mixed fluid stream by using equation [4].

Hence, the main objective to measure the water-to-oil or oil-to-water composition of the petroleum fluid stream is to measure the wave along the transmission line 21 as shown in equation [5], find the S-parameters, e.g. S11, and to obtain the propagation coefficient k. Then in turn, from the propagation coefficient k to find the relative dielectric constant and conductivity, and then resolve to obtain the ration of water-to-oil of vise-versa.

Then to summarize, the advantages using a transmission line is that it is a wide bandwidth device, which enables the multiple frequency measurements.

The impedance of the transmission line is:

$$Z_0 = \sqrt{\frac{L}{c}} = \frac{120}{\sqrt{\varepsilon_1}} \cosh^{-1}\left(\frac{s}{d}\right) \quad [7]$$

Where $\varepsilon_1$, s and d are defined before.

In eqn [7], only $\varepsilon_1$, defined in eqn [4], is frequency dependent. When using high frequency, $\varepsilon_1$ is no longer frequency dependent.

Eqn [7] can be used to determine the ratio of the line distance s to the diameter of the wire, when the impedance $Z_0$ is chosen.

Furthermore, the use of multiple frequency measurement will yield the additional advantages:

According to eqn [4], one can see that when using higher frequency, the dielectric term dominates. While using low frequency, the conductivity term dominates. The use of multiple frequency measurement makes it possible to measure both the dielectric and conductivity property of the fluid.

A spiraled transmission line measures the average material electrical properties around a circle, as described herein. However, there is a need to establish a few parameters as there is an accuracy limit for the measurement of the phase difference over the line. Assume the phase accuracy limit is for example 1 degree. Then we may say the total traveling phase should be the accuracy limit multiplied with a factor. For example we choose this factor as 10. That is to say we need a length L transmission line along which the phase of the wave will change 10 degrees.

We know that when traveling one wavelength, the phase changes with 360 degrees. Hence we have the following relations:

$$l > \frac{\lambda}{36} \quad [8]$$

$$\lambda = \frac{2\pi}{k} = \frac{1}{f\sqrt{\varepsilon_1 \mu_0}} \quad [9]$$

Where $\varepsilon_1$ is the equivalent complex dielectric constant in eqn 4, and f is the frequency.

The above two equations can be used to calculate the length of the spiral line. The turns of the spiral line is the length divided by $\pi$d (d: diameter of the spiral). One can see that the lower the frequency used, the more the turns of the line need to be.

When only high frequency is used, only one turn spiral line may satisfy eqn [8]. The electric conductor may in an embodiment be a single turn spiral line.

Velocity factor and electric length are two terms that are related to the characteristics of a transmission line.

The velocity factor is the ratio of the speed of a wavefront in a medium, to the speed of light in a vacuum.

Figure 8A:
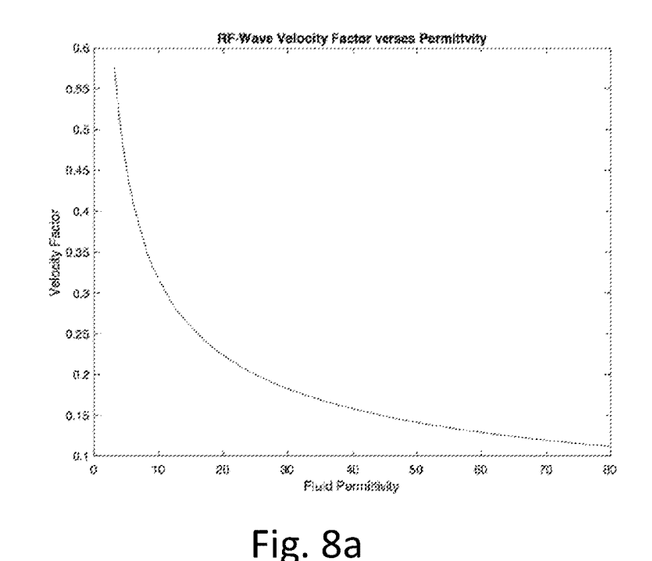
FIG. 8a shows an example of the relationship between the velocity factor and the relative permittivity of a fluid for a given frequency.

In FIG. 8a, an example of the relationship between the velocity factor and the relative permittivity of a fluid is illustrated for a specific frequency. These characteristics are often referred to in the terms of phase shift or "electrical length" at a given frequency. The "electrical length" is used to define phase shift introduced by transmission of an RF-Wave over a conductor or transmission line.

Due to the velocity factor of a particular transmission line, for instance, the transit time of a RF signal in a certain length of cable is equal to the transit time over a longer distance when traveling at the speed of light. So, for example, a pulse sent down a 2 meter long coaxial cable (whose velocity factor is 67%) would arrive at the end of the cable at the same time that the pulse arrives at the end of a bare wire of length 3 meters (over which it propagates at the speed of light), and one might refer the 2 meter section of coax having an electrical length of 3 meters. If the coax is loaded additionally the velocity factor would change correspondingly. So, for a 50% factor the electrical length of the line would equal 4 meters. Thus, we see that the propagation of the RF-Wave is delayed in the transmission line and highly depending on the line electrical characteristics. Some transmission lines consist only of bare conductors, in which case their signals propagate at the speed of light, c. More often the signal travels at a reduced velocity Kc, where K (kappa) is the velocity factor, a number less than 1, representing a ratio of the speed of light.

Thus, in a transmission line, a signal travels at a rate controlled by the effective capacitance and inductance.

In the multiphase flow meter of the invention, the electric wire and ground plane are exposed to a dielectric fluid filling the space in between the wire and ground plane. Thus, the relative permittivity or dielectric constant of the fluid effects the distributed capacitance along the transmission line. In turn, this reduces the velocity factor below unity. The velocity factor will also be reduced due to relative permeability $\mu_r$ of the materials surrounding the wire and the ground plane which increase the disturbed inductance.

Taking permittivity and permeability properties of the cell into account as fluid flows through the Multiphase flow meter, the space between the transmission line and the ground plane is filled with a dielectric fluid of relative permittivity $\epsilon_r$. The velocity of the electromagnetic RF-wave is then reduced by the velocity factor $\kappa$ stipulated below:

$$\kappa = \frac{v_p}{c} = \frac{1}{\sqrt{\epsilon_r \mu_r}} \approx \frac{1}{\sqrt{\epsilon_r}} \quad [10]$$

Thus, this reduced velocity factor would apply to propagation of the RF-signal along the transmission line which is immersed in a large space filled with that fluid dielectric. Part of the electromagnetic RF-wave surrounding each of the conductors "feels" the effect of the dielectric fluid, and parts are in free property space of multiphase flow meter. Then it is possible to define an effective relative permittivity $\epsilon_{eff}$ which then predicts the velocity factor according to:

$$\kappa = \frac{1}{\sqrt{\epsilon_{eff}}} \quad [11]$$

$\epsilon_{eff}$ is computed as a weighted average of the relative permittivity of free space and that of the dielectric properties of the fluids as given in e.g. Table 1 below:

$$\epsilon_{eff} = (1 - F) + F\epsilon_r \quad [12]$$

where the Cell factor, F, expresses the effective proportion of space so affected by the dielectric fluid.

In the case of a space where the majority of the volume in between the electric wire and the ground plane is filled with a dielectric fluid, the Cell factor is unity, since the electromagnetic RF-wave is confined to that region. In some applications, typically as in smaller dimensions flow meters, the Cell factor can be much smaller due to dimensional proportions between the meters housing and the transmission lines. Regardless, any dimensional proportions mentioned, radio frequencies will have its velocity factor (as well as its characteristic impedance) specific for the application intended. In the case of an ideal flow meter, where the Cell factor F=1, the velocity factor is solely determined by the dielectric fluid properties according to e.g. Table 1 below.

For example, a typical velocity factor for a flow meter is 0.577, corresponding to a dielectric constant of 3.0 (typical for oil). Suppose we wish to send a 22.125 MHz signal down a short section of such a cable, and delay it by 36°. In free space, this frequency corresponds to a wavelength of $\lambda_0=13.56$m, so a delay of $\lambda/10$ would require an electrical length of 1.36m. Applying the velocity factor of 0.577, this results in a physical length of cable 0.78 m long.

Vice-versa, for a dielectric fluid corresponding to 80 (seawater) velocity factor is 0.112. Again, using the 22.125 MHz signal the resulting physical length of the cable would be reduced to 0.15 m to measure the same 36 degrees phase change.

Nevertheless, as the transmission line length of the WCM is given by the ratio of phase change needed to accurately measure the properties of the fluid is given by the lower dielectric values to be measured using a 22.125 MHz RF-Wave, the transmission line length would in typical application be 1.5 meter long.

Figure 8B:
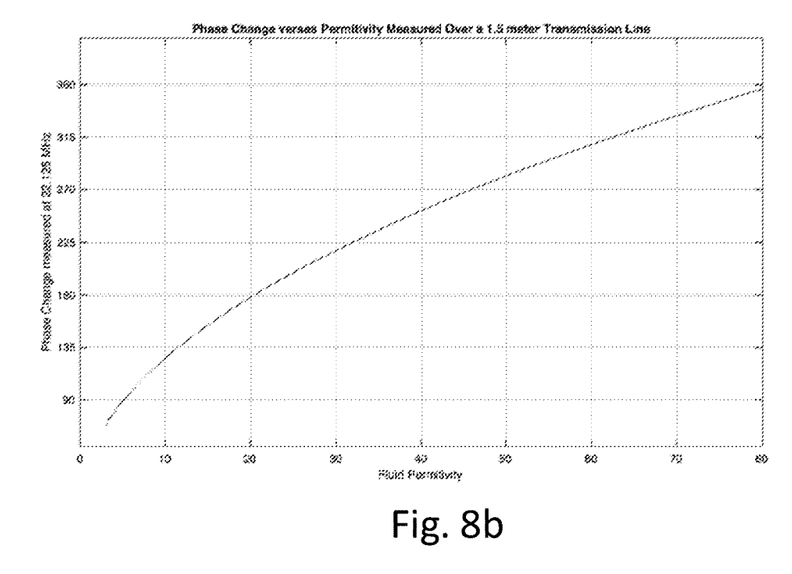
FIG. 8b illustrates the relationship between phase change and relative permittivity of the fluid for a transmission line of 1.5 m at a frequency of 22.125 MHz.

As an example, the phase change measured to establish the fluid dielectric properties could typically be as illustrated in FIG. 8b, illustrating the relationship between phase change and relative permittivity of the fluid for a transmission line of 1.5 m at a frequency of 22.125 MHz. If we consider the endpoints of the graph, a phase difference of 69 degrees corresponds to a relative fluid permittivity of 3.0, while a phase difference of 360 degrees corresponds to a relative permittivity of 80.0.

Figure 8C:
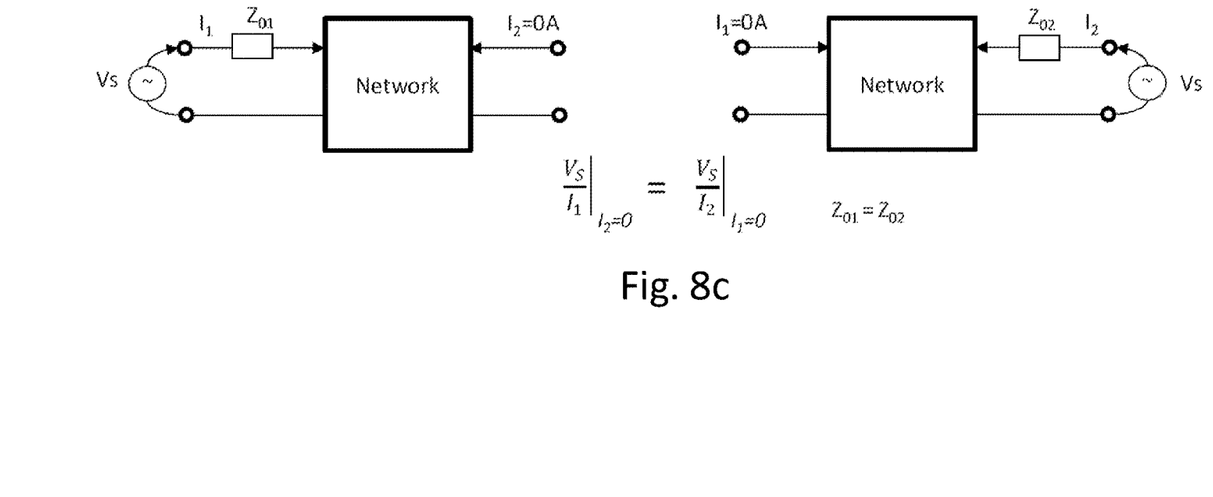
FIG. 8c illustrates the electrical properties of a symmetrical two port network.

The Multiphase flow meter of the invention is in an embodiment considered to be reciprocal or symmetric. The definition of symmetry is achieved if the electrical network properties of the cell are the same with reference to the input output ports. The cell may be represented by two-port network as shown in FIG. 8c.

The two-port network has an input and an output end, here marked $V_1$ and $V_2$ respectively and the network is said to be symmetrical if the ratio of excitation voltage to response current remains the same at both of the ports independently. This is shown in FIG. 13c where the Voltage to Current ratio for the both ports are equal. Thus, the network impedance expressed in Z-parameters, $Z_{11}$ and $Z_{22}$, are the same. In practice this describes the case of the multiphase flow meter of FIG. 4. Here either side of the cell may be defined as input or output port due to the nature of the transmission-line which provides the simplicity of a bare conductor in a housing. Moreover, either side may be used as input port for the fluid flow.

Further, the S- and Z parameters are interrelated, and S parameters can be found from Z parameters and vice-versa. For instance, the S parameter S11 for a two-port symmetrical network may be derived from the following Z-parameters:

$$S_{11} = \frac{(Z_{11} - Z_0)(Z_{22} + Z_0) - Z_{12}Z_{21}}{(Z_{11} + Z_0)(Z_{22} + Z_0) - Z_{12}Z_{21}} \quad [13]$$

Here the input impedance is the same on both sides of the network. I.e. $Z_0=Z_{01}=Z_{02}$, as illustrated in FIG. 8c. Equation may be further simplified taking into account that $Z_{11}=Z_{22}$, which is a condition for symmetry.

The other S-parameters can be derived from the Z parameters in the same way, as will be understood by a person skilled in the art.

As will be recognized by those skilled in the art, the innovative concepts described in this application can be modified and varied over a wide range of applications. By FIG. 7 we illustrate that the invention may embrace modifications and variations that include alternative sensor devices. One of ordinary skill in the art, with the benefit of this disclosure, will recognize the appropriate use of the methods and systems for a chosen application of a given or dynamic set of operating parameters given in FIG. 7a, including pressure, temperature, flow rate, fluid composition, flow direction as well as salinity and/or conductivity of the aqueous phase, or various combinations thereof. Furthermore, the instrument and setup are constructed so that it may be integral part or device of any type industry standard for instrumentation. For this application a traditional 4-20 mA instrument loop configuration including a HART standard helps the instrument to digitally communicate with a receiver or monitor station over the same set of twisted-wires used to convey a traditional 4-20 mA analog instrument signal.

Moreover, including the HART standard and protocol will make present invention operate as a SMART transmitter compared to analog transmitters having a microprocessor as an integral part, which helps for self-diagnostic abilities, non-linear compensations, re-ranging without performing calibrations, and ability to communicate digitally over the network.

Optionally, the methods and configurations of the present invention can be configured or combined in various schemes. The combination or configuration depends partially on the required precision and accuracy and the operational envelope of the process. One of ordinary skill in the art, with the benefit of this disclosure, will recognize the appropriate combination of configuration for a given application.

The configurations as shown in FIGS. 7a and 7b illustrate a setup that are typically used to measure the process flow rate and to estimate the water phase fraction and oil phase fraction in a multiphase petroleum stream. None of the description in the present application should be read as implying that any particular element, step, or function is an essential element which must be included in the claim scope. The scope of patented subject matter is defined only by the allowed claims.

TABLE 1, below, shows the characteristic dielectric and conductive properties of fluids produced from a well.

TABLE 1

Typical electric properties of fluids produced from an oil well.

| Petroleum Stream | Dielectric Constant | Conductivity S/m |
|---|---|---|
| Water | 80 | 3 |
| Oil | 3 | 0.01 |
| Gas | 1 | |

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. An in-line flowmeter sensor device configured to be arranged in-line with a conduit supporting a multi-phase fluid flow comprising first and second matter groups, wherein the second matter group has a lower density than the first matter group, and wherein the sensor device comprises:
    an inlet and an outlet arranged at respective ends of the flowmeter sensor device;
    a measurement chamber arranged between the inlet and the outlet, wherein the measurement chamber is configured to split the first and second matter groups into first and second flow regions, respectively, of the measurement chamber; and
    a flow meter sensor element arranged in or adjacent the first region,
    wherein the measurement chamber comprises:
        a diverging section arranged at the inlet end; and
        a first tubular element connected to the diverging section in a first end,
    wherein an inner diameter of the first tubular element is larger than an inner diameter of the conduit,
    wherein the diverging section is tapered towards the inlet,
    wherein the measurement chamber further comprises a second tubular element between the inlet and the outlet with an outer diameter smaller than the inner diameter of the first tubular element,
    wherein the first flow region is between the first and the second tubular elements,
    wherein the second tubular element comprises holes or perforations allowing first and second fluid phases to pass through, and
    wherein the holes or perforations are multiple longitudinal slits arranged along and around the second tubular element.

2. The in-line flowmeter sensor device of claim 1, wherein the flow measurement chamber comprises a converging section arranged at the outlet end,
    wherein the first tubular element is connected to the diverging section in a second end, and
    wherein the converging section is tapered towards the outlet.

3. The in-line flowmeter sensor device of claim 1, wherein an inner diameter of the second tubular element is smaller than an inner diameter of the inlet, and
    wherein the inlet is connected to the second tubular element via a constricting section.

4. The in-line flowmeter sensor device of claim 1, wherein an inner wall of the measurement chamber comprises helical grooves and/or helical protrusions, and/or the in-line flowmeter sensor device comprises a motor configured to rotate the measurement chamber relative to the inlet and the outlet.

5. An in-line flowmeter configured to be arranged in-line with a conduit supporting a multi-phase fluid flow, wherein the flow meter comprises:
    the in-line flowmeter sensor device according to claim 1;
    a Radio Frequency (RF) electric signal source;
    a dual Radio Frequency (RF) signal detector comprising first and second input ports; and
    a signal processor connected to the signal detector,
    wherein a first terminal of the electric signal source is connected to a first end of a first electric conductor and configured to induce a Radio Frequency electromagnetic wave in the fluid conduit by supplying an input electric signal to the first end of the first electric conductor, and
    wherein the first and second ports of the signal detector are connected to the first and second ends of the first electric conductor, respectively.

6. The in-line flowmeter of claim 5, wherein the measurement chamber is configured to act as a waveguide for the Radio Frequency (RF) signal along the electric conductor.

7. The in-line flowmeter of claim 5, wherein the measurement chamber, the Radio Frequency (RF) electric signal source and the dual Radio Frequency (RF) signal detector have a common electric reference.

8. The in-line flowmeter of claim 5, wherein the signal processor is configured to determine a dielectric constant and a conductivity of the first matter group and further configured to determine a volumetric ratio of fluid phases in the first matter group based on the dielectric constant and a conductivity of the first matter group.

9. A method for real-time monitoring of a volumetric ratio of fluid phases in a first matter group of a multiphase fluid flow comprising first and second matter groups, wherein the second matter group has a lower density than the first matter group, comprising:
    arranging the in-line flowmeter sensor device of claim 1 in line with a conduit supporting a multiphase fluid flow; and
    connecting the flow meter sensor element to a flow meter configured to determine a volumetric ratio of fluid phases in the first matter group based on the characteristics of the sensor element.

10. The method of claim 9, wherein the flowmeter comprises:
    the in-line flowmeter sensor device;
    a Radio Frequency (RF) electric signal source;
    a dual Radio Frequency (RF) signal detector comprising first and second input ports; and
    a signal processor connected to the signal detector,
    wherein a first terminal of the electric signal source is connected to a first end of a first electric conductor and configured to induce a Radio Frequency electromagnetic wave in the fluid conduit by supplying an input electric signal to the first end of the first electric conductor, and
    wherein the first and second ports of the signal detector are connected to the first and second ends of the first electric conductor, respectively.

* * * * *